United States Patent [19]

Bishop, III et al.

[11] 4,442,221

[45] Apr. 10, 1984

[54] PROCESS FOR REGENERATING A SPENT COPPER COMPOSITE SULFUR SORBENT

[75] Inventors: Keith C. Bishop, III, San Rafael; David E. Earls, Pinole; Richard C. Robinson, San Rafael, all of Calif.; Donald W. Blakely, deceased, late of Oakland, Calif.; by Robert L. Jacobson, administrator, Vallejo, Calif.

[73] Assignee: Chevron Research Company, San Francisco, Calif.

[21] Appl. No.: 367,070

[22] Filed: Apr. 9, 1982

[51] Int. Cl.$^3$ .................... B01J 20/34; C10G 29/16; C10G 29/04
[52] U.S. Cl. .................... 502/25; 208/246; 502/517
[58] Field of Search .................... 252/411.5, 412, 413, 252/420, 416; 208/243, 246, 89, 138

[56] References Cited

U.S. PATENT DOCUMENTS

| | | | |
|---|---|---|---|
| 2,381,659 | 8/1945 | Frey | 252/411.5 |
| 4,008,174 | 2/1977 | Jacobson et al. | 252/419 |
| 4,163,708 | 8/1979 | Jacobson et al. | 208/89 |
| 4,204,947 | 5/1980 | Jacobson et al. | 208/243 |

*Primary Examiner*—P. E. Konopka
*Attorney, Agent, or Firm*—Burns, Doane, Swecker & Mathis

[57] ABSTRACT

A process for regenerating a spent copper-porous refractory metal oxide carrier composite sorbent for removing sulfur-containing compounds from naphthas in which the spent sorbent is optionally stripped of absorbed naphtha, oxidized to convert absorbed sulfur to sulfates or sulfur dioxide, optionally reduced to further convert absorbed sulfur to sulfur dioxide, and, finally, impregnated with fresh copper via contact with an aqueous solution of a copper salt followed by drying and calcining to convert the salt to copper oxide or copper metal whereby a substantial portion of the sulfur sorbent activity and lifetime of the sorbent is restored.

7 Claims, No Drawings

PROCESS FOR REGENERATING A SPENT COPPER COMPOSITE SULFUR SORBENT

BACKGROUND OF THE INVENTION

1. Field of the Invention

The invention relates to a process for restoring sulfur-absorbing activity to a spent copper-inorganic porous carrier sorbent for removing sulfur-containing components from hydrocarbons.

2. Description of the Prior Art

U.S. Pat. No. 4,163,708 describes the use of composites of copper compounds and inorganic porous carriers for removing thiol impurities from hydrocarbons to prepare the hydrocarbons for catalytic reforming using platinum or platinum-containing bimetallic catalysts that are poisoned by thiol compounds. The patent teaches that spent composites may be regenerated in a three-stage regeneration process. In the first stage adhered hydrocarbons are stripped from the spent sorbent with a stripping gas. After the stripping the sorbent is subjected to oxidizing conditions to oxidize residual carbon, hydrocarbon, and sulfur compounds on the sorbent. Gas containing a small volume percent of molecular oxygen at 190° C. to 260° C. is a suggested oxidizing medium. The third and final stage of regeneration is to subject the sorbent to a reducing atmosphere to convert copper-sulfur-oxygen moieties on the sorbent to copper oxide/copper metal and sulfur dioxide. The sulfur dioxide is carried away by the reducing gas leaving only the copper oxide/copper on the porous carrier. Nitrogen gas containing a few volume percent hydrogen at 188° C., 5.4 to 6.4 atm is suggested as a reducing medium.

Applicants have found that the regeneration procedure suggested in U.S. Pat. No. 4,163,708 produces less than desired restoration of sorbent activity and lifetime when applied to spent sorbents that do not contain an inherent catalytic oxidizing catalyst, such as chromium or molybdenum oxide, and have been used to remove primarily mercaptans from hydrocarbon feedstocks. With such sorbents it has been found necessary to carry out the reduction stage of the regeneration at much higher temperatures than those suggested in the patent to realize even a minimal level of regeneration. The present invention addresses the problem of regenerating such spent sorbents and provides a novel and unobvious process whereby a substantial portion of the original activity and original lifetime of the sorbent may be restored.

SUMMARY OF THE INVENTION

The invention is a process for regenerating a spent copper-inorganic porous carrier composite sorbent for removing thiol compounds from hydrocarbons comprising:

(a) contacting the spent sorbent with an oxidizing gas at a temperature and for a time sufficient to convert at least a portion of the sulfur in the sorbent to a sulfate form or sulfur dioxide;

(b) optionally contacting the oxidized sorbent with a reducing gas at a temperature and for a time sufficient to further convert the sulfur in the sorbent to sulfur dioxide; and (c) thereafter impregnating the sorbent with fresh copper by:

(i) contacting the sorbent with an aqueous solution of a copper salt whereby the copper salt is deposited on the surface of the sorbent;

(ii) drying the copper salt-treated sorbent to remove solvent; and (iii) calcining the dried copper salt-treated sorbent at elevated temperatures that convert the copper salt on the sorbent to copper oxide or copper metal.

DETAILED DESCRIPTION OF THE INVENTION

The sorbents that are regenerated by the invention process are used to remove sulfur-containing compounds such as hydrogen sulfide, thiophanes, and mercaptans from hydrocarbons that boil in the range of about 50° C. to 200° C. at 760 mm Hg. These hydrocarbons are typically derived from petroleum, oil shale, coal, tar, or other sources and include such refining streams as straight-run and refined naphthas, hydrocrackates and fractions thereof, diesel oil, jet fuel, fuel oil, and kerosene. Preferably, the hydrocarbon is a feedstock to a catalytic reforming process that employs a platinum or platinum-containing bimetallic reforming catalyst. These hydrocarbons will normally contain about 1 to about 10 wppm sulfur before being treated with the sorbent.

The sorbent comprises in its fresh form copper metal and/or copper oxide on an inorganic porous refractory carrier. The copper component will usually constitute about 5% to 40% by weight, preferably 20% to 30% by weight, of the sorbent, calculated as copper metal. The carrier will typically be a natural or synthetic refractory oxide of a Group II, III, or IV metal or mixtures thereof. Examples of such carriers are alumina, silica, attapulgite, silica-alumina, boria, kieselguhr, attapulgite clay, and pumice. The carrier or the sorbent per se will usually have a specific surface area (measured by the B.E.T. method) in the range of about 50 to 250 m$^2$/g, preferably 100 to 200 m$^2$/g. The sorbent particles will usually be pellet shaped and will usually have an average diameter of about 0.1 to 0.5 cm and an L/D ratio (length to diameter) of 1:1 to 10:1.

The sorbent may be made by forming the carrier into pellets and then impregnating the pellets with an aqueous solution of a water soluble copper salt, the anionic portion of which may be readily removed from the composite after or upon drying. An alternative and preferred method for making the sorbent is by comulling particulate carrier and insoluble particulate copper carbonate in a concentrated aqueous slurry, extruding the mixture into pellets, and calcining the pellets to drive carbon dioxide off the copper carbonate. This comulling method is described in U.S. Pat. No. 4,259,213.

Sulfur-containing compounds are removed from the hydrocarbon by contacting the hydrocarbon with the sorbent at temperatures in the range of about 60° C. to about 250° C., preferably 80° C. to 150° C., and pressures that maintain the hydrocarbon in the liquid phase. Such contacting may be carried out by passing the hydrocarbon through one or more fixed bed downflow or upflow sorbing vessels charged with the sorbent. The liquid hourly space velocity (LHSV) will typically be in the range of 3 to 15. Such contacting will usually remove mercaptans or other sulfur compounds from the hydrocarbon to the extent that the sulfur content of the effluent from the sorbent bed(s) is less than about 1.0 wppm, preferably less than 0.2 wppm. Once the sulfur absorbing capacity of the sorbent has been substantially saturated the sorbent is spent and must be regenerated. This end point may be determined by monitoring the sulfur content of the effluent, with the end point being indicated by a rise in sulfur content above about 20% by weight of the sulfur content of the feed. In most instances the end point will be indicated by an effluent sulfur content above about 1 to 2 wppm.

The spent sorbent is regenerated according to the invention process as follows. If the spent sorbent contains substantial amounts of residual hydrocarbons, it is desirable to strip the hydrocarbons from the sorbent before the sorbent is subjected to the oxidizing gas. Stripping gases such as nitrogen, hydrogen, steam, carbon dioxide, or mixtures thereof may be used. The stripping may be carried out at the temperatures used in the sulfur removal (80° C.–150° C.) and may be facilitated by lowering the system pressure from the pressures used in the sulfur removal and passing a gas stream over the sorbent. Stripping is complete when the stripping gas effluent is substantially free of hydrocarbons.

The next step in the regeneration is contacting the hydrocarbon-stripped sorbent with an oxidizing gas under conditions that oxidize residual carbon, hydrocarbons, and at least a portion of the absorbed sulfur, in whatever form, on the sorbent. The carbon and hydrocarbons are oxidized in this step to carbon dioxide and water whereas some of the sulfur is evolved as $SO_2$ and the rest of the sulfur remains on the sorbent after being oxidized to a sulfate form. The sulfate form is believed to be primarily dolerophanite. The oxidizing gas will usually be mixtures of nitrogen and oxygen that contain less oxygen than air. Usually the oxidizing gas will contain 0.3% to 3% oxygen by volume. In some cases the oxidizing gas could also be air or mixtures of air with nitrogen with higher oxygen content than mentioned if suitable means for controlling the oxidation rates and hence the sorbent temperature are available. The oxidation will normally be carried out at temperatures in the range of 450° C. to 700° C., preferably 500° C. to 650° C. The GHSV used in the oxidation step will depend upon the oxygen content of the oxidizing gas and the duration of the step. The GHSV will typically range between 50 and 5000.

After the oxidation the sorbent optionally may be contacted with a reducing gas such as nitrogen containing 0.2% to 4.0% by volume hydrogen to further reduce the remaining sulfur on the sorbent to sulfur dioxide. This sulfur dioxide is carried away by the reducing gas. For sorbents that have been used to remove mercaptans from hydrocarbons the reducing step must be carried out at temperatures exceeding about 500° C., typically in the range of 550° C. to 650° C.

Under the above regeneration conditions only a fraction of the original sorbent life is recovered (e.g. approximately half of the original life of a sorbent containing about a third of its weight in copper), apparently due to conversion or degradation of the copper component into a form that is substantially inactive as regards capacity to absorb sulfur compounds. The final step in the regeneration process restores a substantial portion of its original activity and life to the sorbent. Such restoration of both activity and life is contrary to expectation.

In the final step of the regeneration the sorbent from the high temperature oxidation or reduction, as the case may be, is impregnated with copper by contacting it with a dilute aqueous solution of a water soluble copper salt that upon being dried and calcined at elevated temperatures converts to copper metal or copper oxide. The copper salt that is used to impregnate the sorbent should not leave a residue on the sorbent upon drying that might be leached from the sorbent and contaminate the hydrocarbon. Examples of copper salts that may be used in the impregnation are cupric bromide, cupric bromate, cupric chloride, cupric nitrate, and cupric salicylate. These salts are dissolved in an aqueous medium at about 10% to 50% by weight and applied to the sorbent. The contacting of the sorbent and the copper salt solution will usually be carried out at about 10° C. to 60° C. for about ¼ to ½ hr. The volume ratio of salt solution to sorbent will usually be about 0.2:1 to about 0.6:1. Excess salt solution, if any remains, is thereafter drained from the sorbent and the sorbent is dried to remove water and calcined at elevated temperatures that convert the salt on the sorbent to copper metal or copper oxide. The drying will typically be done in air at temperatures in the range of 100° C. to 300° C. followed by calcining at 400° C. to 550° C.

The stripping of hydrocarbons from the spent sorbent, if necessary, will typically be carried out in the sorbing vessels which will, of course, be equipped with lines, valves, and other mechanisms required to pass the stripping gas through the vessels and regulate the temperatures and pressures in the vessels to those ranges required for the step. The remaining steps will usually require removal of the sorbent from the sorbing vessels and placement in other vessels or containers which are designed for these purposes. The oxidation and reduction steps may be carried out by placing the stripped sorbent into a fixed bed downflow or upflow reactor vessel and passing the oxidizing/reducing gases repeatedly through the sorbent bed at the desired temperatures and pressures until the oxidation/reduction is complete. The last step in the regeneration—the copper salt impregnation—will usually be carried out in another vessel that is designed for solids-liquid mixing.

The following examples further illustrate the invention process. These examples are not intended to limit the invention in any manner.

EXAMPLE 1

A spent sulfur sorbent was regenerated as follows. The original (prior to use) composition of the sorbent was CuO 25% by weight calculated as metal Alumina 69% by weight.

This sorbent was made by the basic process described in U.S. Pat. No. 4,259,213 and was used to remove sulfur compounds from petroleum naphtha feedstocks. In its spent condition it contained 4.21% by weight sulfur.

A sample of this spent sorbent was placed in a laboratory reactor and it was oxidized with one vol % $O_2$ in $N_2$ at about 350° C., GHSV 300, for 48 hr. Analysis of the oxidized sorbent indicated it contained 4.54% by weight sulfur. The pore volume of a 100 g portion of the oxidized sorbent was measured and found to be 0.47 cc/gm. Forty g $Cu(NO_3)_2 \cdot 3H_2O$ was dissolved in water to a sufficient volume (47 ml) to fill the pore volume of the portion. The portion and the solution were mixed to permit all the solution to be absorbed by the portion. The portion was then dried at about 120° C. for 2 hr and then calcined at about 230° C. for 2 hr and for an additional 2 hr at about 500° C. The resulting oxidized, Cu impregnated sorbent was analyzed and found to contain 32.5% by weight Cu and 4.07% by weight sulfur.

The extent of restoration of the sorbing ability of the oxidized, Cu impregnated sorbent was determined by using it to remove mercaptan sulfur from a Mid-Continent petroleum naphtha. Each sorbent was placed in a laboratory sorbing vessel as the naphtha, containing 20 wppm sulfur (18 wppm in the fresh sorbent run) was passed through the vessel at about 185° C., 150 psig and a LHSV of 5 (except fresh catalyst was run at 7.5 LHSV). The time to breakthrough (the run time at which the sulfur in the vessel effluent was 20% of the sulfur in the feed, i.e. 4 wppm or, in the fresh sorbent run 3.6 wppm, was about 750 hr for the oxidized, Cu impregnated sorbent, about 400 hr for the oxidized sorbent, and 375 hr for the fresh sorbent at 7.5 LHSV.

Calculation of the amount of sulfur removed by each sorbent showed that the oxidized, Cu impregnated sorbent removed about 6.2% sulfur by weight, the oxidized sorbent was about 3.5% sulfur by weight, and the fresh sorbent about 5.6% sulfur by weight.

EXAMPLE 2

The regeneration of Example 1 was repeated except that the oxidation temperature was about 500° C. rather than about 350° C. The pore size of the oxidized sorbent was found to be 0.50 cc/gm. Analysis of the oxidized, Cu impregnated sorbent indicated it contained 32.2% by weight Cu and 3.79% by weight sulfur. This regenerated sorbent was tested according to the laboratory sulfur removal test described in Example 1 and found to be an effective sorbent.

Modifications of the embodiments of the invention that are obvious to those of skill in the chemical, sorbent and/or refining arts are intended to be within the scope of the following claims.

We claim:

1. A process for regenerating a spent copper inorganic porous carrier composite sorbent for removing sulfur-containing compounds from hydrocarbons comprising:
   (a) contacting the spent sorbent with an oxidizing gas at a temperature and for a time sufficient to convert at least a portion of the sulfur in the sorbent to a sulfate form or sulfur dioxide; and
   (b) thereafter impregnating the sorbent with fresh copper by
      (i) contacting the sorbent with an aqueous solution of a copper salt whereby the copper salt is deposited on the sorbent surface;
      (ii) drying the copper salt-treated sorbent to remove solvent;
      (iii) calcining the dried sorbent at an elevated temperature that converts the copper salt on the sorbent to copper oxide or copper metal; and
      (iv) recovering the regenerated sorbent without having removed a substantial portion of the contaminant sulfur.

2. The process of claim 1 wherein between steps (a) and (b) the oxidized sorbent is contacted with a reducing gas at a temperature and for a time sufficient to further convert the sulfur in the sorbent to sulfur dioxide.

3. The process of claim 2 wherein the oxidizing gas is nitrogen containing about 0.3% to about 3% by volume oxygen and the reducing gas is nitrogen containing about 0.2% to about 4% by volume hydrogen.

4. The process of claim 1 wherein the oxidizing gas is air.

5. The process of claim 1 wherein the sorbent is contacted with the oxidizing gas at a temperature of about 450° C. to about 700° C.

6. The process of claims 1, 2, 3, 4 or 5 wherein the copper salt is selected from the group consisting of cupric bromide, cupric nitrate, cupric bromate, cupric chloride, and cupric salicylate, the copper salt constitutes about 10% to about 50% by weight of the solution, the volume ratio of solution to sorbent is in the range of 0.2:1 to 0.6:1, and the elevated temperature is in the range of about 400° C. to about 550° C.

7. The process of claim 1 wherein the copper salt is copper nitrate, the copper nitrate constitutes about 10% to 50% by weight of the solution and said elevated temperature is in the range of about 400° C. to about 550° C.

* * * * *